United States Patent
Israel et al.

(10) Patent No.: US 11,681,710 B2
(45) Date of Patent: Jun. 20, 2023

(54) ENTITY EXTRACTION RULES HARVESTING AND PERFORMANCE

(71) Applicant: Microsoft Technology Licensing, LLC, Redmond, WA (US)

(72) Inventors: Moshe Israel, Ramat-Gan (IL); Yaakov Garyani, Raanana (IL); Or Cohen, Kfar Monash (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 801 days.

(21) Appl. No.: 16/231,517

(22) Filed: Dec. 23, 2018

(65) Prior Publication Data

US 2020/0201856 A1    Jun. 25, 2020

(51) Int. Cl.
*G06F 7/00* (2006.01)
*G06F 16/2457* (2019.01)
*G06F 16/26* (2019.01)
*G06N 20/00* (2019.01)
*G06F 16/2455* (2019.01)

(52) U.S. Cl.
CPC ...... *G06F 16/2457* (2019.01); *G06F 16/2455* (2019.01); *G06F 16/26* (2019.01); *G06N 20/00* (2019.01)

(58) Field of Classification Search
CPC .. G06F 16/2457; G06F 16/26; G06F 16/2455; G06F 16/254; G06F 16/2365
See application file for complete search history.

(56) References Cited

U.S. PATENT DOCUMENTS

| | | | |
|---|---|---|---|
| 6,360,217 B1 * | 3/2002 | Gopal | G06Q 10/109 |
| 9,135,560 B1 * | 9/2015 | Saurabh | G06N 5/022 |
| 9,262,519 B1 * | 2/2016 | Saurabh | G06F 16/285 |
| 9,503,472 B2 | 11/2016 | Laidlaw et al. | |

(Continued)

OTHER PUBLICATIONS

"International Search Report and Written Opinion Issued in PCT Application No. PCT/US2019/066432", dated Mar. 3, 2020, 13 Pages.

(Continued)

*Primary Examiner* — Mohammed R Uddin
(74) *Attorney, Agent, or Firm* — Ogilvie Law Firm

(57) ABSTRACT

Security Information and Event Management tools, log management tools, log analysis tools, and other event data management tools are enhanced. Enhancements harvest entity extraction rules from queries, query results, and other examples involving the extraction of field values from large amounts of data, and help perform entity extraction efficiently. Entity extraction operations locate IP addresses, usernames, and other field values that are embedded in logs or data streams, for example, and populate object properties with extracted values. Previously used extraction rules are applied in new contexts with different users, different data sources, or both. An entity extraction rules database serves as a model that contains rules specifying parsing mechanisms. Parsing mechanisms may include regular expressions, separation character definitions, and may process particular file formats or object notation formats or markup language formats. A recommender suggests extraction rules to users, based on frequency, machine learning classifications, correctness certainty, or other considerations.

20 Claims, 8 Drawing Sheets

(56) References Cited

U.S. PATENT DOCUMENTS

| | | | | |
|---|---|---|---|---|
| 9,984,386 | B1* | 5/2018 | Bhatia | G06Q 30/0241 |
| 10,445,311 | B1* | 10/2019 | Saurabh | G06F 16/2365 |
| 2005/0160086 | A1* | 7/2005 | Haraguchi | G06Q 10/00 |
| 2006/0031182 | A1* | 2/2006 | Ryan | G06N 5/04 |
| | | | | 706/50 |
| 2006/0136493 | A1* | 6/2006 | Muralidharan | G06F 21/6227 |
| 2006/0195297 | A1* | 8/2006 | Kubota | G06F 16/95 |
| | | | | 702/187 |
| 2007/0288479 | A1* | 12/2007 | Howard | G06F 16/9566 |
| 2008/0010225 | A1* | 1/2008 | Gonsalves | G06N 7/005 |
| | | | | 706/11 |
| 2010/0057667 | A1* | 3/2010 | Gotoh | G06N 5/025 |
| | | | | 706/59 |
| 2010/0161785 | A1* | 6/2010 | Xue | G06F 16/9535 |
| | | | | 709/224 |
| 2011/0066585 | A1 | 3/2011 | Subrahmanyam et al. | |
| 2011/0072494 | A1* | 3/2011 | Sato | G06F 3/0481 |
| | | | | 726/4 |
| 2011/0295854 | A1* | 12/2011 | Chiticariu | G06F 16/313 |
| | | | | 707/737 |
| 2015/0025875 | A1* | 1/2015 | Perrone | G06F 40/30 |
| | | | | 704/9 |
| 2015/0180894 | A1* | 6/2015 | Sadovsky | H04L 67/22 |
| | | | | 726/22 |
| 2016/0224643 | A1* | 8/2016 | Robichaud | G06F 16/254 |
| 2016/0224804 | A1* | 8/2016 | Carasso | G06F 3/0484 |
| 2017/0286455 | A1* | 10/2017 | Li | G06F 16/24575 |
| 2017/0286525 | A1* | 10/2017 | Li | G06F 16/2477 |
| 2018/0089182 | A1 | 3/2018 | Gladishev et al. | |
| 2018/0089561 | A1* | 3/2018 | Oliner | G06N 3/0454 |
| 2018/0096157 | A1 | 4/2018 | Israel et al. | |
| 2018/0176227 | A1 | 6/2018 | Israel et al. | |
| 2018/0248893 | A1 | 8/2018 | Israel et al. | |
| 2018/0295149 | A1 | 10/2018 | Gazit et al. | |
| 2018/0302430 | A1 | 10/2018 | Israel et al. | |

OTHER PUBLICATIONS

Bier, et al., "Entity Quick Click: Rapid Text Copying Based on Automatic Entity Extraction", retrieved from <<http://www.edwardishak.com/publications/chi2006_bier.pdf>>, Apr. 2006, 6 pages.
Eirc Shanks, "Use Amazon CloudWatch Logs Metric Filters to Send Alerts", retrieved from <<https://theithollow.com/2017/12/11/use-amazon-cloudwatch-logs-metric-filters-send-alerts/>>, Dec. 11, 2017, 8 pages.
"Practical Guide to ESM Rules", retrieved from <<https://communitysoftwaregrp.com/t5/ArcSight-Best-Practices/Practical-Guide-to-ESM-Rules/ta-p/1644898>>, no later than Nov. 28, 2018, 7 pages.
"CAPTCHA", retrieved from <<https://en.wikipedia.org/wiki/CAPTCHA>>, Nov. 22, 2018, 9 pages.
"Crowdsourcing", retrieved from <<https://en.wikipedia.org/wiki/Crowdsourcing>>, Nov. 16, 2018, 15 pages.
Mary Koes, "Extracting value from your logs with Stackdriver logs-based metrics", retrieved from <<https://cloud.google.com/blog/products/gcp/extracting-value-from-your-logs-with-stackdriver-logs-based-metrics>>, Dec. 11, 2017, 5 pages.
Editor, "4 Best Event Log Analysis Tools & Software for Windows/Open Source (Free & Paid)", retrieved from <<https://www.ittsystems.com/best-event-log-analysis-tools/>>, Jun. 5, 2018, 13 pages.
"Named-entity recognition", retrieved from <<https://en.wikipedia.org/wiki/Named-entity_recognition>>, Oct. 14, 2018, 6 pages.
"User Naming Attributes", retrieved from <<https://docs.microsoft.com/en-us/windows/desktop/ad/naming-properties>>, May 30, 2018, 5 pages.
"Security Identifier", retrieved from <<https://en.wikipedia.org/wiki/Security_Identifier>>, Aug. 31, 2018, 6 pages.
"Security information and event management", retrieved from <<https://en.wikipedia.org/wiki/Security_information_and_event_management>>, Oct. 10, 2018, 5 pages.
Duane Waddle, "Splunk—bucket lexicons and segmentation", retrieved from <<https://www.duanewaddle.com/splunk-bucket-lexicons-and-segmentation/>>, May 11, 2014, 8 pages.
"What is props.conf in splunk?", retrieved from <<https://answers.splunk.com/answers/440370/what-is-propsconf-in-splunk.html>>, Aug. 10, 2016, 7 pages.
Suarez-Tangil, et al., "Providing SIEM systems with self-adaptation", retrieved from <<http://dx.doi.org/10.1016/inffus.2013.04.009>>, 2013, 14 pages.
"Splunk® Enterprise Admin Manual 6.4.2", retrieved from <<http://docs.splunk.com/index.php?title=Documentation:Splunk:Admin:Propsconf:6.4.2&action=pdfbook&version=6.4.2&product=Splunk>>, Nov. 16, 2018, 722 pages.
"Splunk® Enterprise Alerting Manual 7.2.0", retrieved from <<https://docs.splunk.com/index.php?title=Documentation:Splunk:Alert:AlertWorkflowOverview:6.3.0beta&action=pdfbook&version=7.2.0&product=Splunk>> Nov. 14, 2018, 55 pages.
"Splunk® Enterprise Getting Data In 7.2.1", retrieved from <<http://docs.splunk.com/index.php?title=Documentation:Splunk:Data:Whysourcetypesmatter:6.3.0beta&action=pdfbook&version=7.2.1&product=Splunk>>, Nov. 28, 2018, 419 pages.
"Splunk® Enterprise Knowledge Manager Manual 7.2.1", retrieved from <<http://docs.splunk.com/index.php?title=Documentation:Splunk:Knowledge:Aboutfields:Minty&action=pdfbook&version=7.2.1&product=Splunk>>, Nov. 26, 2018, 430 pages.
"Splunk® Enterprise Search Reference 7.2.1", retrieved from <<http://docs.splunk.com/index.php?title=Documentation:Splunk:SearchReference: WhatsInThisManual:6.2beta&action=pdfbook&version=7.2.1&product=Splunk>>, Nov. 28, 2018, 730 pages.
"Splunk® Quick Reference Guide", retrieved from <<https://www.splunk.com/pdfs/solution-guides/splunk-quick-reference-guide.pdf>>, no later than Nov. 29, 2018, 6 pages.

* cited by examiner

| ID | Time | Domain | User | Location | MoreData |
|---|---|---|---|---|---|
| 1 | 2018-01-14 14:01 | Redmond | Kobi | 192.168.12.89 | {'userSID':'S-1-1-18', 'where': 'home'} |
| 2 | 2018-01-13 13:12 | Redmond | Or | 192.168.12.129 | {'userSID':'S-1-1-19', 'where': 'work'} |
| 3 | 2018-01-17 14:53 | Israel | Moshe | 192.168.12.23 | {'userSID':'S-1-1-1234', 'where': 'home'} |
| 4 | 2018-01-12 11:47 | Redmond | Kobi | 192.168.120.81 | {'userSID':'S-1-1-18', 'where': 'home'} |

Fig. 6

| ID | Timestamp | User Details | User_IP_Address | Location |
|---|---|---|---|---|
| 1 | 1/14/2018 14:01 | {'user': 'Redmond\Kobi', 'userSID':'S-1-1-18'} | 192.168.12.89 | Home |
| 2 | 1/13/2018 13:12 | {'user': 'Redmond\Or', 'userSID':'S-1-1-19'} | 192.168.12.129 | Work |
| 3 | 1/17/2018 14:53 | {'user': 'Israel\Moshe', 'userSID':'S-1-1-1234'} | 192.168.12.23 | Home |
| 4 | 1/12/2018 11:47 | {'user': 'Redmond\Kobi', 'userSID':'S-1-1-18'} | 192.168.120.81 | Home |

Fig. 7

| Trace ID | Trace Timestamp | Trace |
|---|---|---|
| 1 | 1/14/2018 14:01 | User 'Redmond\Kobi' ('S-1-1-18') connected from 'Home' from IP 192.168.12.89 |
| 2 | 1/13/2018 13:12 | User 'Redmond\Or' ('S-1-1-19') connected from 'Work' from IP 192.168.12.129 |
| 3 | 1/17/2018 14:53 | User 'Israel\Moshe' ('S-1-1-1234') connected from 'Home' from IP 192.168.12.23 |
| 4 | 1/12/2018 11:47 | User 'Redmond\Kobi' ('S-1-1-18') connected from 'Home' from IP 192.168.120.81 |

Fig. 8

| UserName | Domain | SID | Location |
|---|---|---|---|
| Kobi | Redmond | S-1-1-18 | - |
| Or | Redmond | S-1-1-19 | - |
| Moshe | Israel | S-1-1-1234 | - |
| Kobi | Redmond | S-1-1-18 | . |
| . | . | . | . |

Fig. 9

ENTITY EXTRACTION RULES HARVESTING AND PERFORMANCE

BACKGROUND

Noon Security Information and Event Management (SIEM) tools, log management tools, log analysis tools, and other event data management tools help system administrators, network administrators, developers, quality assurance personnel, security personnel, and other people work with large amounts of data generated in a computer network or other computing system. The generated data may be monitored, searched, analyzed, visualized, filtered, grouped, and otherwise processed. The processing often occurs in a real-time or nearly real-time manner. The amount of data processed varies from one tool to another, and from one installation to another, but in commercial contexts of interest the processed data amounts may range from at least a gigabyte per day up to several terabytes per day, for example. Data processing activities may involve locating particular values in a log or data stream and copying located values into event data structures; this is sometimes called "entity extraction". Entity extraction is sometimes accomplished computationally by parsing event data in a log or data stream to locate field values of interest and copying some or all of those field values into corresponding properties of event data structures. One or more events may then be processed to generate alerts, security control activations, visualizations, summaries, enrichments, and other useful results.

SUMMARY

As taught herein, some event data management tools and processes are tailored to improve computing system efficiency by applying an entity extraction rule in a different context than the context where the rule was initially formed, e.g., a context including a different data source or a different user or both. Similarly, some embodiments taught herein enhance the effectiveness of event data parsing by automatically identifying and recommending candidate entity extraction rules instead of requiring users to manually reformulate suitable rules.

Some embodiments for efficient parsing to populate entity properties based on event data which are presented herein include a processor, a digital memory in operable communication with the processor, a set of entity identifiers with each entity identifier having an entity property identifier, an entity extraction rules database containing entity extraction rules with each entity extraction rule specifying a parsing mechanism to parse an entity field of event data, and an entity extraction rule recommender. In operation, the entity extraction rule recommender examines particular event data from an event data source and produces a recommendation. The recommendation cites an entity extraction rule and also targets an entity identifier for use in extracting entity field values from the particular event data and using the extracted entity field values to populate corresponding entity properties.

Some embodiments or embodiment environments presented herein provide or utilize actions that include managing baseline event data from a baseline set of event data sources, collecting multiple entity extraction examples from output of the event data management tool based on the baseline event data, and computing an entity extraction rule based on at least one collected entity extraction example, with each computed entity extraction rule specifying a parsing mechanism to parse at least one entity field. After receiving additional event data from an additional event data source which is not in the baseline set of event data sources, an embodiment applies the parsing mechanism specified by one of the entity extraction rules to extract one or more entity field values from the additional event data and to populate one or more corresponding entity properties using one or more extracted entity field values.

Other technical mechanisms, structures, and activities pertinent to teachings herein will also become apparent to those of skill in the art. The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

FIG. 6 is a text table illustrating aspects of event data in a first example source format;

FIG. 7 is a text table illustrating aspects of event data in a second example source format;

FIG. 8 is a text table illustrating aspects of event data in a third example source format;

FIG. 9 is a text table illustrating aspects of extracted event data in an example recommendation presentation format;

DETAILED DESCRIPTION

Overview

Figure 1:
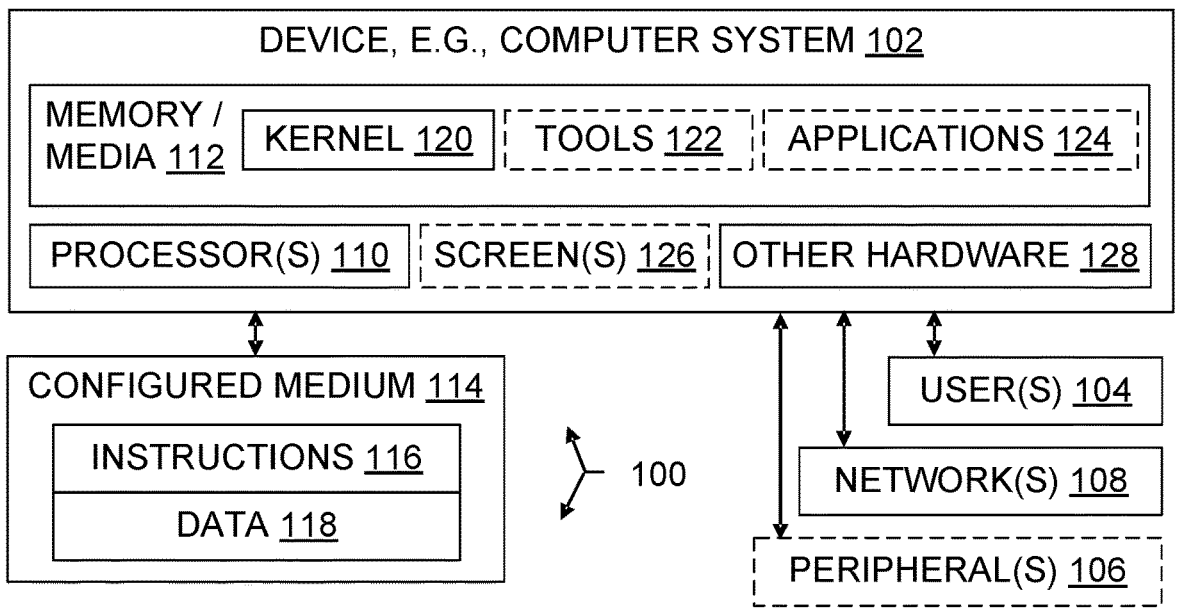
FIG. 1 is a block diagram illustrating a computer system generally and also illustrating a configured storage medium generally.

Many innovations expand beyond their origins, but understanding an innovation's origins can help one more fully appreciate the innovation. In the present case, some teachings presented herein were motivated by a technical challenge of simplifying and improving a process of entity extraction in a Security Information and Event Management (SIEM) product, after recognizing that the existing entity extraction approach took significant time to maintain and required uncommon expertise. Other technical challenges addressed by the innovations taught here will also be apparent to one of skill from the discussion provided below.

In some SIEM systems, users have a way to import custom log data. The SIEM system is unfamiliar with these logs and their structure beforehand. In order for the system to be able to include these logs and their information in advanced scenarios such as data enrichment, behavioral analytics, security alerting, and so on, some mechanism for extracting the important information that is embedded in the logs is required. One may refer this process as "data normalization", as "entity extraction", or as something else, but regardless of the name used a goal is to extract values of interest from a data stream or log or other data source to populate data structures that drive the advanced scenarios to generate alerts, security control activations, visualizations, summaries, filtered or enhanced data, or other useful results.

A given computing environment may include many types of entities, such as an Account, a Host or IP address, and so on. Each entity may have multiple identifier types in different data structures. For example, in some environments running Microsoft® software, an Account can be defined by a SID (security identifier), by a Windows NT® domain name, or a User Principal Name (UPN) (marks of Microsoft Corporation). These are valid identifiers used with different structures. Extracting entities (via their identifiers) may require high expertise, e.g., when a user is called on to define the entity extraction rules in a relatively complex language and also expected to be familiar with the source and target fields.

Some embodiments disclosed herein automatically find and suggest entity extraction rules for source data. This can be accomplished by learning which rules are defined by (relatively advanced) users and applying the learned knowledge to other users. Rules applied by other users, or used against other data sources, or both, can be presented to the user in question as a recommendation for entity extraction. The user can be given an opportunity to approve the rule for use, or the rule can be automatically used in a service, e.g., as an internal use whose extraction results are provided to the user even though the underlying extraction rule is not made explicit to the user.

For example, assume multiple users have created a mapping from a field that has a structure of a SID (user security identifier) into a SID property of an Account entity (an entity which may be implemented, e.g., as an object or other data structure which digitally represents an account). A SID may look something like "S-1-0" or "S-1-2-1". Then a new user accesses a new log type that contains a field with a similar structure. An embodiment may suggest that the user create (or approve) the same entity extraction rule as the previous users.

Some embodiments described herein may be viewed by some people in a broader context. For instance, concepts such as copying, data, parsing, recommendations, and rules may be deemed relevant to a particular embodiment. However, it does not follow from the availability of a broad context that exclusive rights are being sought herein for abstract ideas; they are not. Rather, the present disclosure is focused on providing appropriately specific embodiments whose technical effects fully or partially solve particular technical problems, such as how to efficiently recommend tool extensions that tend to make development more productive. Other configured storage media, systems, and methods involving copying, data, parsing, recommendations, or rules are outside the present scope. Accordingly, vagueness, mere abstractness, lack of technical character, and accompanying proof problems are also avoided under a proper understanding of the present disclosure.

More generally, one of skill will recognize that not every part of this disclosure, or any particular details therein, are necessarily required to satisfy legal criteria such as enablement, written description, or best mode. Also, embodiments are not limited to the particular programming languages, tools, contexts, identifiers, fields, properties, files, or other implementation choices described herein. Any apparent conflict with any other patent disclosure, even from the owner of the present innovations, has no role in interpreting the claims presented in this patent disclosure.

Technical Character

The technical character of embodiments described herein will be apparent to one of ordinary skill in the art, and will also be apparent in several ways to a wide range of attentive readers. Some embodiments address technical activities that are rooted in computing technology and improve the functioning of computing systems by making those systems more efficient. Specifically, some embodiments increase data parsing efficiency by expanding the contexts in which a data extraction rule is applied. Without the context expansion, parsing would be done only after the delay inherent in reformulating suitable extraction rules, or would not be done at all. Likewise, security, usability, and other characteristics that rely on prompt parsing of gigabytes of data are improved when parsing occurs sooner and more broadly than would have been the case if the entity extraction rules that define parsing mechanisms were reformulated instead of being ported to new contexts. Other advantages based on the technical characteristics of the teachings will also be apparent to one of skill from the description provided.

Acronyms, Abbreviations, and Names

Some acronyms, abbreviations, and names are defined below. Others are defined elsewhere herein, or do not require definition here in order to be understood by one of skill.

ALU: arithmetic and logic unit
API: application program interface, a.k.a. application programming interface
BIOS: basic input/output system
CD: compact disc
CPU: central processing unit
DVD: digital versatile disk or digital video disc
FPGA: field-programmable gate array
FPU: floating point processing unit
GPU: graphical processing unit
GUI: graphical user interface
GUID: globally unique identifier
ID: identifier
IP: internet protocol
JSON: JavaScript Object Notation
LAN: local area network
ML: machine learning
OS: operating system
RAM: random access memory
ROM: read only memory
SID: security identifier SIEM: Security Information and Event Management
UPN: user principal name
VoIP: voice over IP
WAN: wide area network
XML: extensible markup language Some Additional Terminology Reference is made herein to exemplary embodiments such as those illustrated in the drawings, and specific language is used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise the right to specific and chosen lexicography. Quoted terms are being defined explicitly, but a term may also be defined implicitly without using quotation marks. Terms may be defined, either explicitly or implicitly, here in the Detailed Description and/or elsewhere in the application file.

As used herein, a "computer system" may include, for example, one or more servers, motherboards, processing nodes, laptops, tablets, personal computers (portable or not), personal digital assistants, smartphones, smartwatches, smartbands, cell or mobile phones, other mobile devices having at least a processor and a memory, video game systems, augmented reality systems, holographic projection systems, televisions, wearable computing systems, and/or other device(s) providing one or more processors controlled at least in part by instructions. The instructions may be in the form of firmware or other software in memory and/or specialized circuitry.

A "multithreaded" computer system is a computer system which supports multiple execution threads. The term "thread" should be understood to include any code capable of or subject to scheduling (and possibly to synchronization), and may also be known by another name, such as "task," "process," or "coroutine," for example. The threads may run in parallel, in sequence, or in a combination of parallel execution (e.g., multiprocessing) and sequential execution (e.g., time-sliced).

A "processor" is a thread-processing unit, such as a core in a simultaneous multithreading implementation. A processor includes hardware. A given chip may hold one or more processors. Processors may be general purpose, or they may be tailored for specific uses such as vector processing, graphics processing, signal processing, floating-point arithmetic processing, encryption, I/O processing, and so on.

"Kernels" include operating systems, hypervisors, virtual machines, BIOS code, and similar hardware interface software.

"Code" means processor instructions, data (which includes constants, variables, and data structures), or both instructions and data. "Code" by itself and "software" are used interchangeably herein. Executable code, interpreted code, and firmware are some examples of code. Code which must be interpreted or compiled in order to execute is referred to as "source code".

"Program" is used broadly herein, to include applications, kernels, drivers, interrupt handlers, firmware, state machines, libraries, services, cloud infrastructure components, middleware, and other code written by programmers (who are also referred to as developers) and/or automatically generated.

"Service" means a consumable program offering in a cloud computing environment or other network or computing system environment.

"Cloud" means pooled resources for computing, storage, and networking which are elastically available for measured on-demand service. A cloud may be private (e.g., on-premises), public, community, or a hybrid, and cloud services may be offered in the form of infrastructure as a service, platform as a service, software as a service, or another service. Unless stated otherwise, any discussion of reading from a file or writing to a file includes reading/writing a local file or reading/writing over a network, which may be a cloud network or other network, or doing both (local and networked read/write).

Unless otherwise indicated, "field" refers to data or a data location in a data source such as a data stream or a log, whereas "property" refers to data or a data location in an object or other data structure that represents an entity. Thus, data is said to be extracted from a field and placed in a property.

For present purposes, "entity extraction rules" includes, e.g., rules for extracting two or more field values into respective properties of an entity, rules for extracting two or more field values into respective properties which are associated with multiple entities, and rules for extracting a single field value into a single property or another destination. Accordingly, some entity extraction rules may also be accurately referred to as "property extraction rules" or "field extraction rules" or the like.

As used herein, "include" allows additional elements (i.e., includes means comprises) unless otherwise stated.

"Optimize" means to improve, not necessarily to perfect. For example, it may be possible to make further improvements in a program or an algorithm which has been optimized.

"Process" is sometimes used herein as a term of the computing science arts, and in that technical sense encompasses resource users, namely, coroutines, threads, tasks, interrupt handlers, application processes, kernel processes, procedures, and object methods, for example. "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a "process"). Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment. Operations such as parsing data to identify a field value, copying data into an entity or other object, populating properties with field values, updating a database of extraction rules, calculating an extraction rule correctness certainty value, and modifying a computing system display device are understood herein as inherently digital. A human mind cannot interface directly with a CPU or network interface card or other processor, or with RAM or other digital storage, to read and write the necessary data and perform the necessary operations on digital values to perform the entity extraction and other data processing steps taught herein. This would be well understood by persons of skill in the art in view of the present disclosure, but others may sometimes need to be informed or reminded of the facts. Unless stated otherwise, embodiments are also presumed to be capable of operating at scale (i.e., one gigabyte or more of event data into or through a system per day) in production environments, or in testing labs for production environments, as opposed to being mere thought experiments.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

Throughout this document, use of the optional plural "(s)", "(es)", or "(ies)" means that one or more of the indicated features is present. For example, "processor(s)" means "one or more processors" or equivalently "at least one processor".

For the purposes of United States law and practice, use of the word "step" herein, in the claims or elsewhere, is not intended to invoke means-plus-function, step-plus-function, or 35 United State Code Section 112 Sixth Paragraph/Section 112(f) claim interpretation. Any presumption to that effect is hereby explicitly rebutted.

For the purposes of United States law and practice, the claims are not intended to invoke means-plus-function interpretation unless they use the phrase "means for". Claim language intended to be interpreted as means-plus-function language, if any, will expressly recite that intention by using the phrase "means for". When means-plus-function interpretation applies, whether by use of "means for" and/or by a court's legal construction of claim language, the means recited in the specification for a given noun or a given verb should be understood to be linked to the claim language and linked together herein by virtue of any of the following: appearance within the same block in a block diagram of the figures, denotation by the same or a similar name, denotation by the same reference numeral, a functional relationship depicted in any of the figures, a functional relationship noted in the present disclosure's text. For example, if a claim limitation recited a "zac widget" and that claim limitation became subject to means-plus-function interpretation, then at a minimum all structures identified anywhere in the specification in any figure block, paragraph, or example mentioning "zac widget", or tied together by any reference numeral assigned to a zac widget, or disclosed as having a functional relationship with the structure or operation of a zac widget, would be deemed part of the structures identified in the application for zac widgets and would help define the set of equivalents for zac widget structures.

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as applying, assigning, calculating, citing, collecting, computing, determining, displaying, executing, extracting, getting, identifying, managing, mapping, parsing, performing, populating, producing, querying, receiving, recommending, sending, specifying, targeting (and applies, applied, assigns, assigned, etc.) with regard to a destination or other subject may involve intervening action such as forwarding, copying, uploading, downloading, encoding, decoding, compressing, decompressing, encrypting, decrypting, authenticating, invoking, and so on by some other party, yet still be understood as being performed directly by the party of interest.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. For the purposes of patent protection in the United States, a memory or other computer-readable storage medium is not a propagating signal or a carrier wave or mere energy outside the scope of patentable subject matter under United States Patent and Trademark Office (USPTO) interpretation of the In re Nuijten case. No claim covers a signal per se or mere energy in the United States, and any claim interpretation that asserts otherwise in view of the present disclosure is unreasonable on its face. Unless expressly stated otherwise in a claim granted outside the United States, a claim does not cover a signal per se or mere energy.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory are not propagating signal or carrier wave computer readable media. Unless expressly stated otherwise in the claim, "computer readable medium" means a computer readable storage medium, not a propagating signal per se and not mere energy.

An "embodiment" herein is an example. The term "embodiment" is not interchangeable with "the invention". Embodiments may freely share or borrow aspects to create other embodiments (provided the result is operable), even if a resulting combination of aspects is not explicitly described per se herein. Requiring each and every permitted combination to be explicitly and individually described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

LIST OF REFERENCE NUMERALS

The following list is provided for convenience and in support of the drawing figures and as part of the text of the specification, which describe innovations by reference to multiple items. Items not listed here may nonetheless be part of a given embodiment. For better legibility of the text, a given reference number is recited near some, but not all, recitations of the referenced item in the text. The same reference number may be used with reference to different examples or different instances of a given item. The list of reference numerals is:

100 operating environment, also referred to as computing environment; may be further characterized in some situations as a development environment or a production environment, for example 102 computer system, also referred to as computational system or computing system 104 users 106 peripherals 108 network generally 110 processor 112 computer-readable storage medium, e.g., RAM, hard disks 114 removable configured computer-readable storage medium 116 instructions executable with processor; may be on removable storage media or in other memory (volatile or non-volatile or both)

118 data 120 kernel(s), e.g., operating system(s), BIOS, device drivers 122 tools, e.g., anti-virus software, firewalls, packet sniffer software, intrusion detection systems (IDS), intrusion prevention systems (IPS), software development tools and tool suites, hardware development tools and tool suites 124 applications, e.g., word processors, web browsers, spreadsheets, games, email tools, web apps 126 display screens, also referred to as "displays"

128 computing hardware not otherwise associated with a reference number 106, 108, 110, 112, 114

202 event data management tool, e.g., SIEM tool, log analysis tool, log management tool; these are also examples of tools 122

204 user interface, e.g., a GUI or a set of APIs; may include a "management interface", "management APIs", or "management plane" in some environments 206 code which performs monitoring operations, e.g., network or host intrusion detection code, traffic balancing code, network connectivity failure detection code 208 code which performs alerting, e.g., to notify an administrator or security personnel of a condition that may require their attention 210 entity identifiers, e.g., class names or object names or GUIDs or other identifiers of entities which are defined in or represented in a computing environment, such as users, user accounts, machines, storage locations, datasets, and so on 212 entity property 214 entity property identifier 216 event data source, e.g., data stream or log 218 event data generally 220 field in event data 222 value of field in event data 224 event data extraction rule example collector 226 event data extraction rule instance or usage example 228 extraction rule modeling communications, e.g., extraction rule recommendations, current user identification, current data source identification, other contextual information 230 entity defined in or represented in a computing environment, such as user, user account, machine, storage location, dataset, and so on 232 entity extraction enhancer 234 database containing entity extraction rules 236 entity extraction rules 238 parsing mechanism, e.g., regular expression, definition of field separation character, list of field marker symbols or keywords, flag indicating presence of XML, flag indicating presence of JSON, and so on 240 entity parser code 242 entity extraction rule recommender code 244 entity extraction rule recommendation 246 entity extraction rule modeler 302 property which identifies a user 304 security property 306 property which identifies a domain or workgroup or security-restricted computing environment 308 access control identification property 310 property which identifies a non-digital location, e.g., department or other organizational unit, company, city, country, and so on 312 property which identifies a digital location, e.g., network endpoint, network address, host or other machine interface or address, server, digital storage location, and so on 314 property which identifies a physical machine, e.g., a laptop, workstation, tablet, and so on 316 property which identifies a virtual machine, e.g., in a cloud computing environment 402 entity extraction rule which extracts at least one field value from event data which is in a JSON format 404 entity extraction rule which includes a definition of a regular expression 406 entity extraction rule which identifies a particular character as being a field separation or other data splitting character 408 event data which is in a JSON format 410 definition of a regular expression, e.g., in a particular programming language, as a sequence of characters that define a search pattern, or both 412 regular expression, namely, a text pattern matching mechanism 414 a text character, e.g., in ASCII, Unicode, UTF-8, or another format 416 a text character which is used as a data splitting character 500 aspects of extraction rule modeling 502 query from event data management tool directed at event data 504 result of query 502

Figure 12:
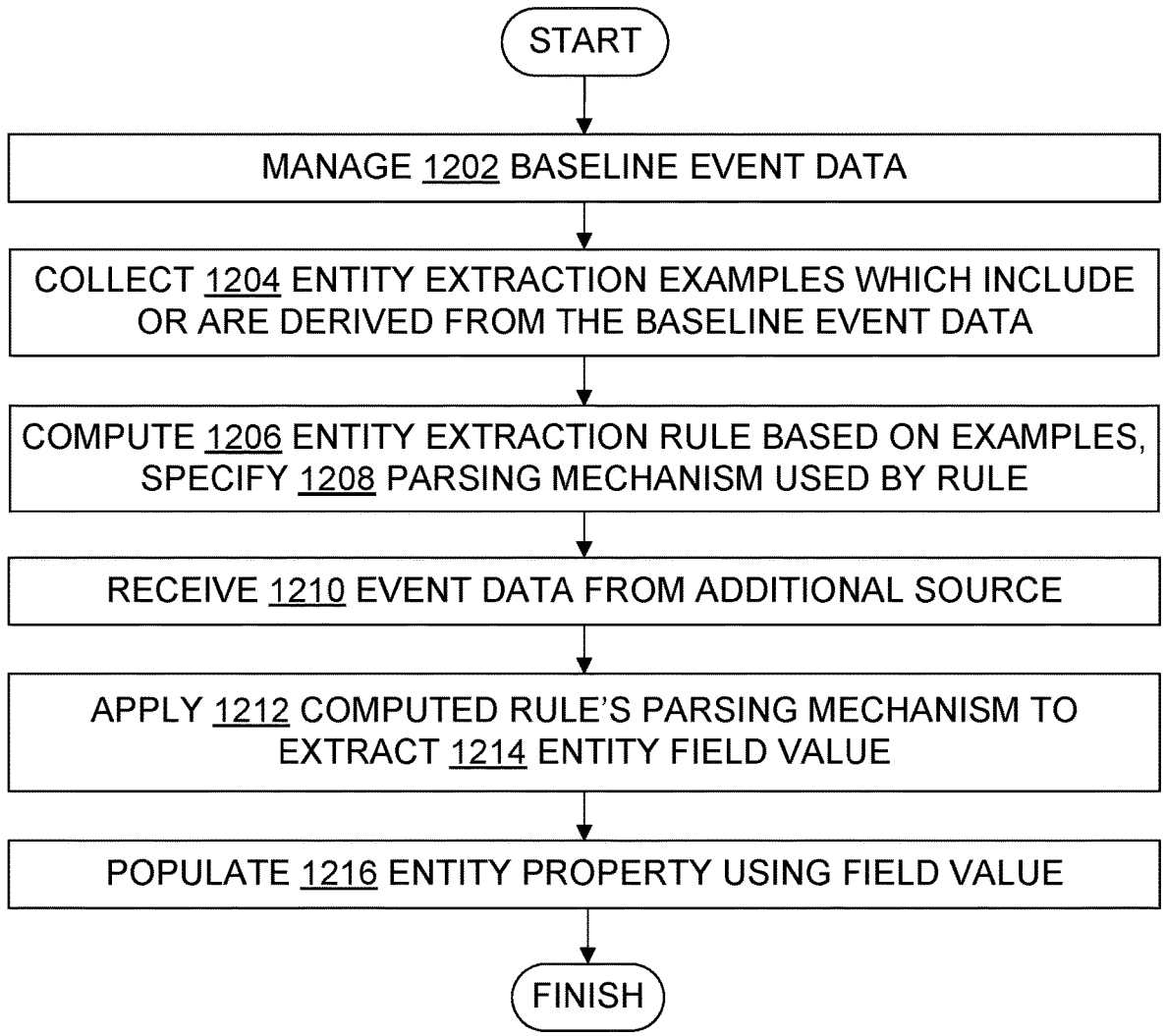
FIG. 12 is a flowchart illustrating some example entity extraction methods from an administrator perspective.

506 column name 508 machine learning classifier for entity extraction rule modeling 510 code for calculating frequency of use of entity extraction rule 512 frequency (relative, absolute, or both) of use of entity extraction rule 514 correctness certainty level indicating likely or apparent correctness of entity extraction rule for use in a particular context 1002 management interface to SIEM system 1004 SIEM system 1200 entity extraction methods which include steps shown in FIG. 12; also refers to the FIG. 12 flowchart illustrating these methods 1202 manage baseline event data, e.g., by processing the event data in one or more of the ways noted herein to produce useful results 1204 collect entity extraction examples, sometimes also referred to as "entity extraction rule examples"

Figure 13:
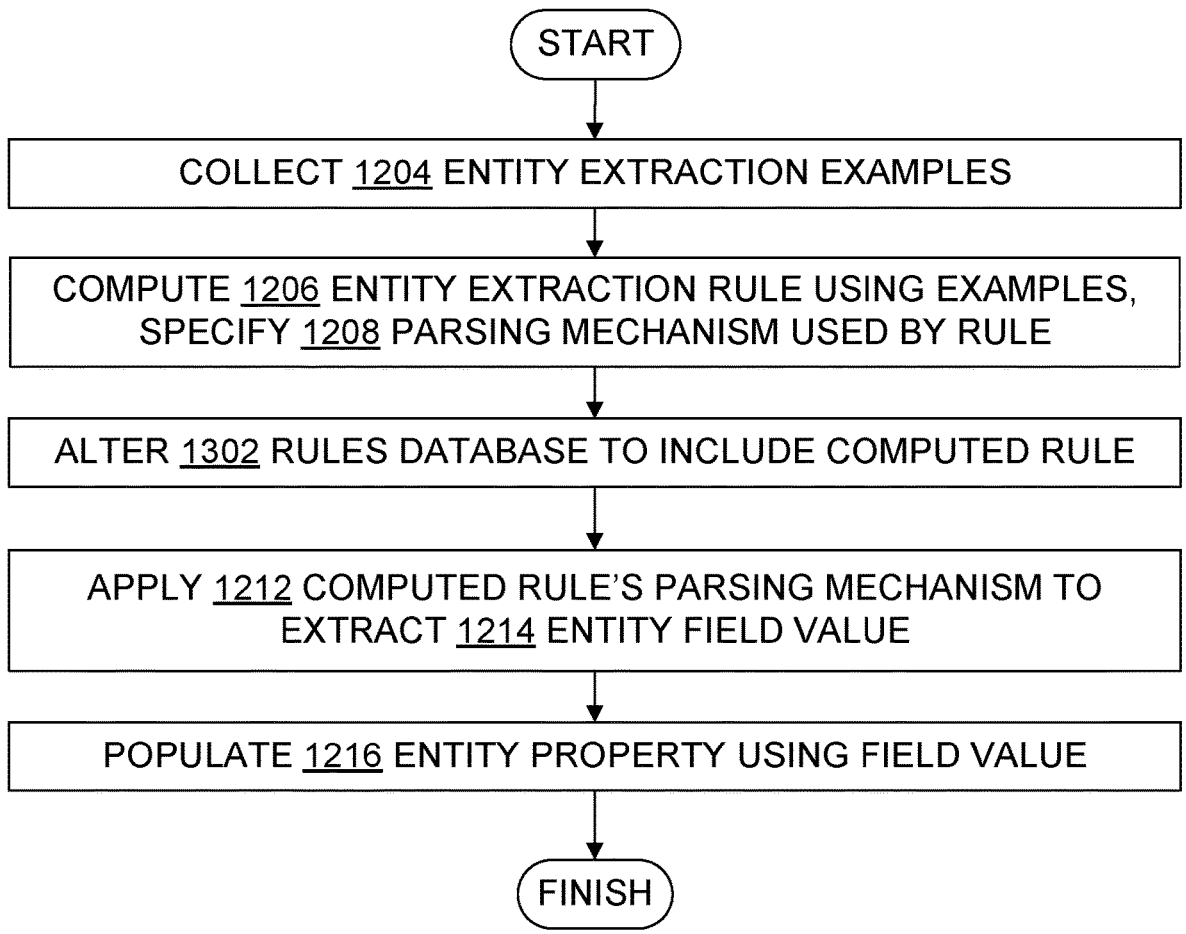
FIG. 13 is a flowchart illustrating some example entity extraction methods from an entity extraction enhancer perspective.
Figure 14:
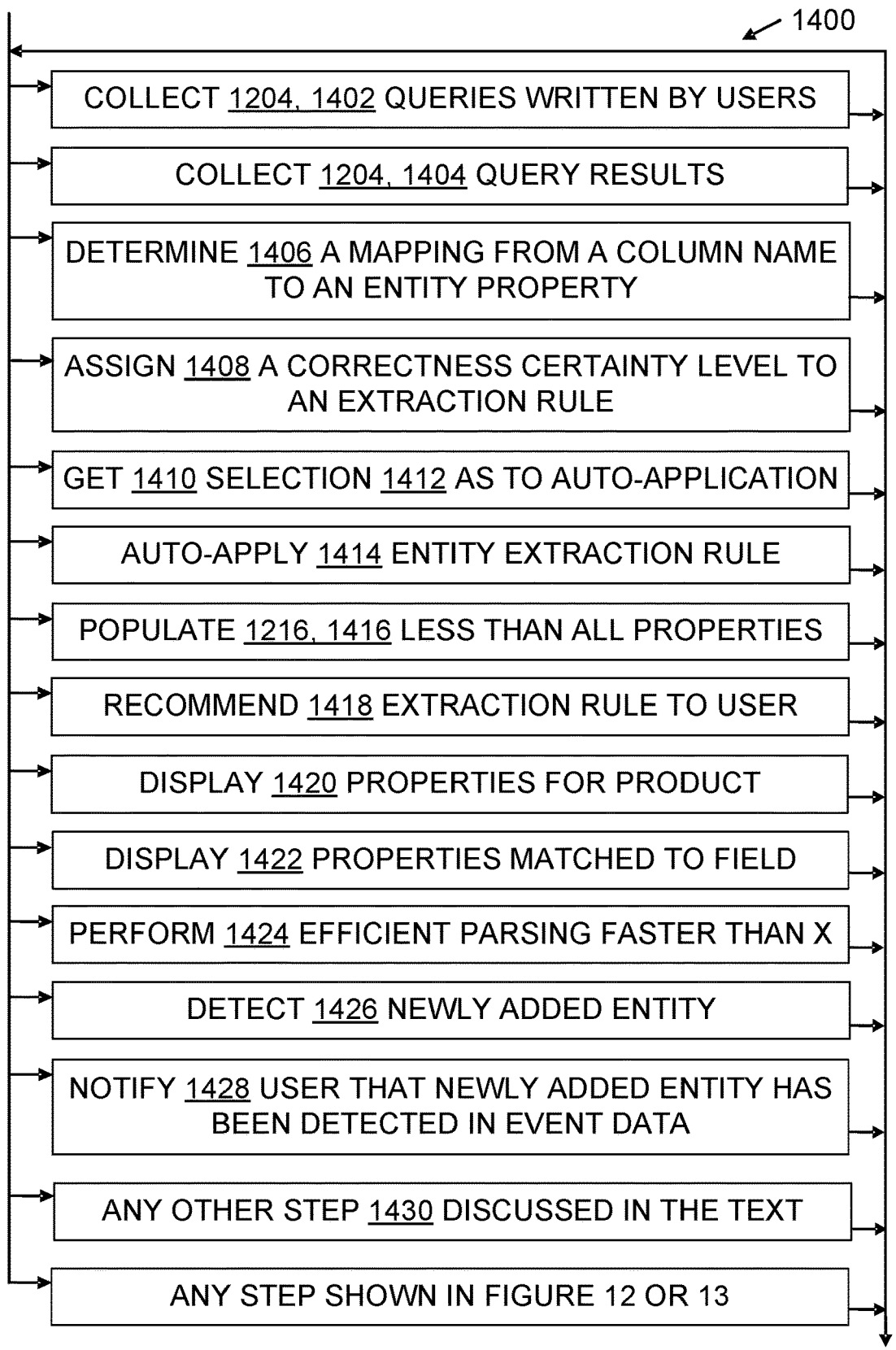
FIG. 14 is a flowchart further illustrating steps in some entity extraction methods.

1206 compute an entity extraction rule, e.g., by selecting a previously formulated extraction rule based on examples, or by modifying an existing rule or formulating a new rule 1208 specify a parsing mechanism, e.g., by creating or selecting a regular expression, a field separation character, or a textual pattern to match, or by flagging the presence of a familiar format such as JSON or XML formats 1210 receive event data from a data source 1212 apply an extraction rule (also referred to as applying an extraction rule's parsing mechanism) to locate a field value in event data 1214 extract a field value by copying it from a location in event data 1216 populate an entity object property by copying a value into it 1300 entity extraction methods which include steps shown in FIG. 13; also refers to the FIG. 13 flowchart illustrating these methods 1302 alter a rules database to include a rule R, e.g., by adding the rule R to the database or by modifying a rule already in the database to match or include the rule R 1400 entity extraction methods which include steps shown in FIG. 14; also refers to the FIG. 14 flowchart illustrating these methods; note that FIG. 14 includes by reference FIGS. 13 and 12

1402 collect queries 1404 collect query results 1406 determine a mapping from a column name to an entity property 1408 assign a correctness certainty level 1410 get a selection from a user 1412 selection from a user 1414 automatically apply an entity extraction rule 1416 populate a proper subset of the properties of an entity 1418 recommend an entity extraction rule 1420 display properties associated with a particular product 1422 display correspondence between one or more properties and one or more fields 1424 perform parsing or modeling operations within at most a specified maximum amount of clock time or within at most a specified maximum number of processor cycles or system clock time 1426 detect change in entities 1428 notify users upon detecting newly added entities.

1430 any step discussed in the present disclosure that has not been assigned some other reference numeral Operating Environments With reference to FIG. 1, an operating environment 100 for an embodiment includes at least one computer system 102. The computer system 102 may be a multiprocessor computer system, or not. An operating environment may include one or more machines in a given computer system, which may be clustered, client-server networked, and/or peer-to-peer networked within a cloud. An individual machine is a computer system, and a group of cooperating machines is also a computer system. A given computer system 102 may be configured for end-users, e.g., with applications, for administrators, as a server, as a distributed processing node, and/or in other ways.

Human users 104 may interact with the computer system 102 by using displays, keyboards, and other peripherals 106, via typed text, touch, voice, movement, computer vision, gestures, and/or other forms of I/O. A screen 126 may be a removable peripheral 106 or may be an integral part of the system 102. A user interface may support interaction between an embodiment and one or more human users. A user interface may include a command line interface, a graphical user interface (GUI), natural user interface (NUI), voice command interface, and/or other user interface (UI) presentations, which may be presented as distinct options or may be integrated.

System administrators, network administrators, software developers, hardware developers, engineers, security personnel, and end-users are each a particular type of user 104, although it is contemplated that most users will likely be administrators or security personnel who are end-users of an event data management tool. Automated agents, scripts, playback software, and the like acting on behalf of one or more people may also be users 104, e.g., to facilitate testing a system 102, but end-users are people (not processes) unless clearly indicated otherwise. Storage devices and/or networking devices may be considered peripheral equipment in some embodiments and part of a system 102 in other embodiments, depending on their detachability from the processor 110. Other computer systems not shown in FIG. 1 may interact in technological ways with the computer system 102 or with another system embodiment using one or more connections to a network 108 via network interface equipment, for example.

Each computer system 102 includes at least one processor 110. The computer system 102, like other suitable systems, also includes one or more computer-readable storage media 112. Storage media 112 may be of different physical types. The storage media 112 may be volatile memory, non-volatile memory, fixed in place media, removable media, magnetic media, optical media, solid-state media, and/or of other types of physical durable storage media (as opposed to merely a propagated signal or mere energy). In particular, a configured storage medium 114 such as a portable (i.e., external) hard drive, CD, DVD, memory stick, or other removable non-volatile memory medium may become functionally a technological part of the computer system when inserted or otherwise installed, making its content accessible for interaction with and use by processor 110. The removable configured storage medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory is a signal per se or mere energy under any claim pending or granted in the United States.

The storage medium 114 is configured with binary instructions 116 that are executable by a processor 110; "executable" is used in a broad sense herein to include machine code, interpretable code, bytecode, and/or code that runs on a virtual machine, for example. The storage medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by backup, restore, commits, aborts, reformatting, and/or other technical operations.

Although an embodiment may be described as being implemented as software instructions executed by one or more processors in a computing device (e.g., general purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include hardware logic components 110, 128 such as Field-Programmable Gate Arrays (FPGAs), Application-Specific Integrated Circuits (ASICs), Application-Specific Standard Products (AS-SPs), System-on-a-Chip components (SOCs), Complex Programmable Logic Devices (CPLDs), and similar components. Components of an embodiment may be grouped into interacting functional modules based on their inputs, outputs, and/or their technical effects, for example.

In addition to processors 110 (e.g., CPUs, ALUs, FPUs, and/or GPUs), memory/storage media 112, and displays 126, an operating environment may also include other hardware 128, such as batteries, buses, power supplies, wired and wireless network interface cards, for instance. The nouns "screen" and "display" are used interchangeably herein. A display 126 may include one or more touch screens, screens responsive to input from a pen or tablet, or screens which operate solely for output. In some embodiments peripherals 106 such as human user I/O devices (screen, keyboard, mouse, tablet, microphone, speaker, motion sensor, etc.) will be present in operable communication with one or more processors 110 and memory. Software processes may be users 104, but unless clearly indicated otherwise, end-users are human.

In some embodiments, the system includes multiple computers connected by a network 108. Networking interface equipment 128 can provide access to networks 108, using components such as a packet-switched network interface card, a wireless transceiver, or a telephone network interface, for example, which may be present in a given computer system. However, an embodiment may also communicate technical data and/or technical instructions through direct memory access, removable nonvolatile storage media, or other information storage-retrieval and/or transmission approaches.

One of skill will appreciate that the foregoing aspects and other aspects presented herein under "Operating Environments" may form part of a given embodiment. This document's headings are not intended to provide a strict classification of features into embodiment and non-embodiment feature sets.

One or more items are shown in outline form in the Figures, or listed inside parentheses, to emphasize that they are not necessarily part of the illustrated operating environment or all embodiments, but may interoperate with items in the operating environment or some embodiments as discussed herein. It does not follow that items not in outline or parenthetical form are necessarily required, in any Figure or any embodiment. In particular, FIG. 1 is provided for convenience; inclusion of an item in FIG. 1 does not imply that the item, or the described use of the item, was known prior to the current innovations.

More About Systems

Examples are provided herein to help illustrate aspects of the technology, but the examples given within this document do not describe all of the possible embodiments. Embodiments are not limited to the specific configurations, implementations, arrangements, displays, features, groupings, approaches, or scenarios provided herein. A given embodiment may include additional or different technical features, mechanisms, sequences, components, or data structures, for instance, and may otherwise depart from the examples provided herein.

Figure 2:
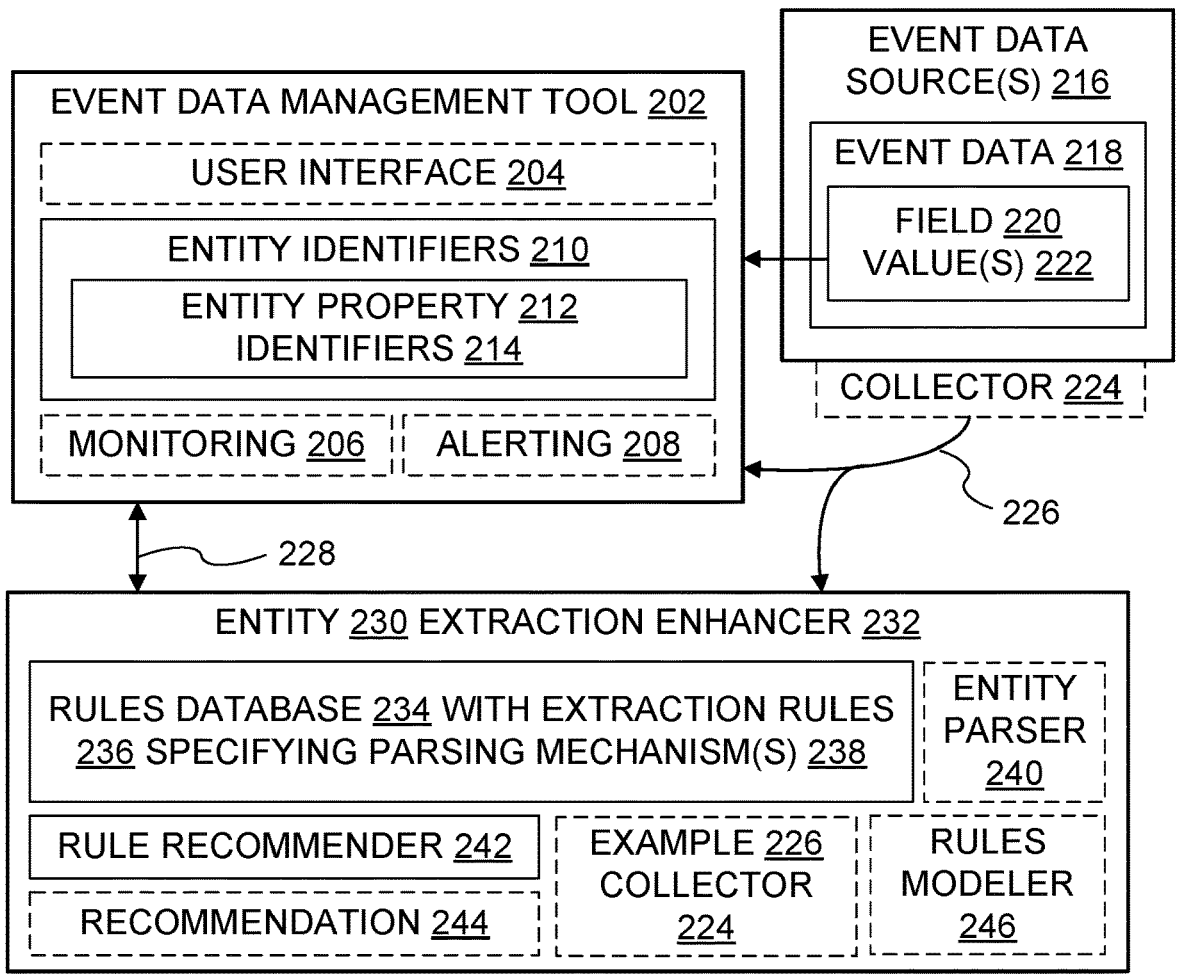
FIG. 2 is a block diagram illustrating aspects of a computing technology environment which includes one or more event data sources, an event data management tool, and entity extraction enhancement components.

FIG. 2 illustrates aspects of some event data processing architectures that are suitable for some embodiments taught herein. Event data 218 is obtained from one or more event sources 216 such as logs, data streams, monitoring agents, Splunk® forwarders (mark of Splunk, Inc.), or similar software. Field values 222 are embedded within the event data. The event data is consumed by an event data management tool 202, 122, which generally has a user interface 204 and code for processing the event data. In particular, the tool 202 may have monitoring code 206 or alerting code 208. Instead of working directly with the event data in the raw form sent by the data source, the tool 202 extracts values from fields 220 that are found in the raw data and places copies of the found values in properties 212 of objects or of other entities 230 that have semantics tailored for the monitoring, alerting, visualization, behavior analysis, and other processing that can be done through the tool 202.

The field value extraction is implemented using parsing mechanisms 238 of entity extraction rules 236. The entity extraction rules allow the tool 202 to locate IP addresses or usernames, for example, in the raw data 218, and to parse the IP address values 222, username values 222, and so on, in order to separate them from the surrounding raw data. The entity extraction rules 236 also indicate where the located values should be placed, that is, which values 222 should be copied into which properties 212 of which entities 230.

Figure 3:
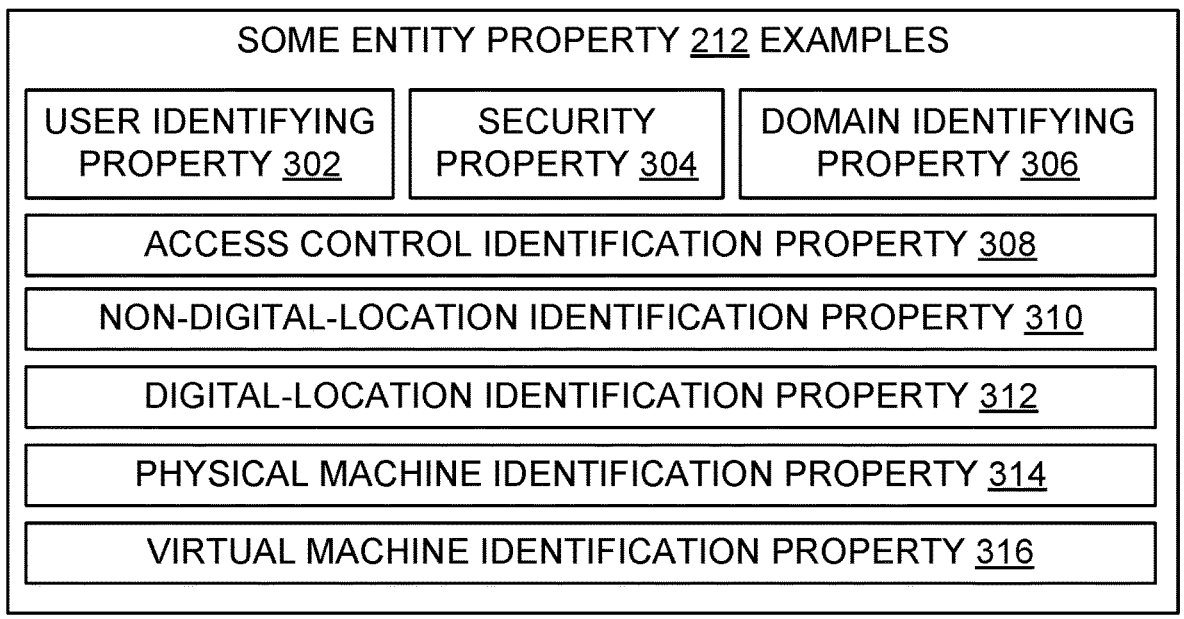
FIG. 3 is a block diagram illustrating some examples of entity properties described according to their functionality.

FIG. 3 illustrates some examples of entity properties 212. Properties can be described in various ways, e.g., by their names, the entity(ies) they are used in, their data type, or their semantic functionality. As shown, the semantic functionality of properties may include identifying users, identifying domains, identifying virtual or physical machines, identify digital or non-digital locations, and identifying security controls.

Figure 4:
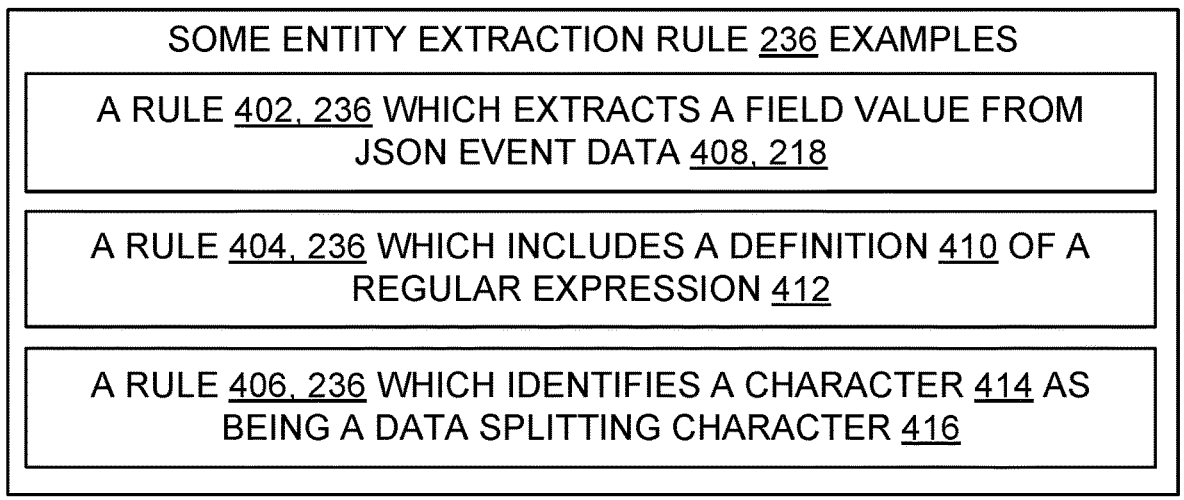
FIG. 4 is a block diagram illustrating some examples of entity extraction rules described according to their syntax parsing functionality.

FIG. 4 illustrates some examples of entity extraction rules 236. Rules 236 can be described in various ways, e.g., by their names, by the field(s) or property(ies) or entity(ies) they are used with, by the data type of extracted values, or by the rules' syntax assumptions or capabilities. As shown, rules may be characterized in particular by whether they parse JSON formatted data, by whether they define or use a regular expression, or by which characters are assigned special roles such as field separators. FIG. 4 presents only some of the many possible examples of extraction rules, and one of skill will acknowledge that field values may be located in event data using other parsing mechanisms which are not specifically shown, e.g., comma-separated value (CSV) formats, XML formats, and formats particular to a given programming language.

Figure 5:
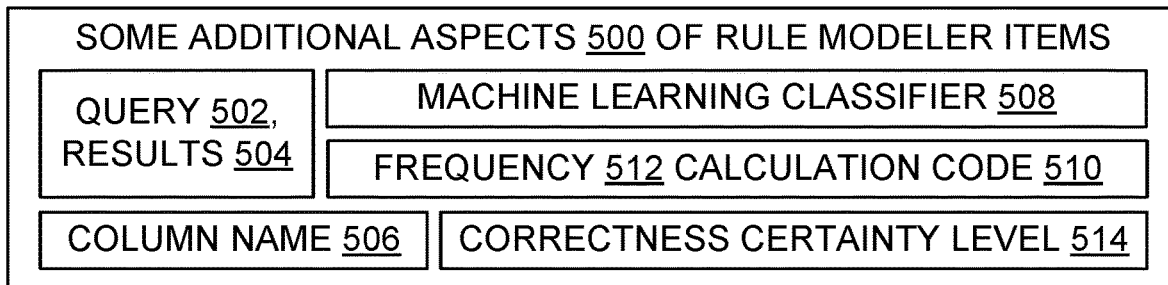
FIG. 5 is a block diagram illustrating some additional aspects of extraction rule modeling.

FIG. 5 adds to the rule modeling aspects 500 shown in FIGS. 2 through 4. In particular, FIG. 5 shows queries 502 and query results 504. Some event data management tools 202 pose queries 502 which search event data and produce results 504. To produce query results, the tool 202 applies entity extraction rules 236 to obtain field values from event data, and then performs further processing using the extracted values to obtain a useful outcome for the user. As just a few of the many possibilities, a query 502 might seek as a result 504 the names of all host machines 102 which received a ping request in the past hour, or the source IP addresses of all failed login attempts during the past day, or the organizational units whose traffic currently includes more than ten percent of the total VoIP traffic. Other items shown in FIG. 5, and items presented in FIGS. 6 through 14, are discussed elsewhere herein.

Some embodiments provide or utilize an entity extraction system for efficient parsing to populate entity properties based on event data. An illustrative system includes a processor 110, a digital memory 112 in operable communication with the processor 110, and a set of entity identifiers 210 with each entity identifier including at least one entity property identifier 214. This example system also includes an entity extraction rules database 234 containing a plurality of entity extraction rules 236. Each entity extraction rule specifies a parsing mechanism 238 to parse at least one entity field 220 of event data 218. This example system also includes an entity extraction rule recommender 242 which, upon execution by the processor, examines particular event data from an event data source 216 and produces a recommendation 244. The recommendation 244 cites at least one entity extraction rule 236 and also targets at least one entity identifier 210. The recommendation effectively recommends the cited rule 236 for use in extracting one or more entity field values 222 from the particular event data and for using the one or more extracted entity field values to populate one or more corresponding entity properties 212.

Some embodiments further include an entity parser 240. Upon execution, the parser 240 receives the recommendation 244 and applies the parsing mechanism 238 specified by the entity extraction rule (the rule cited in the recommendation) to extract one or more entity field values 222 from the particular event data and to populate one or more corresponding entity properties 212 using the one or more extracted entity field values.

Some embodiments include a user interface 204, which does not necessarily reside in the tool 202, or even on the same machine as the tool 202. The entity parsing recommender 242 recommends to a user 104, through the user interface 204, at least one entity extraction rule 236. The rule 236 is located in or through the entity extraction rules database 234. In this example, the entity parsing recommender 242 also recommends at least one entity identifier 210, along with the recommended rule 236, as being items which correspond to the particular event data 218 and hence could be used to fruitfully process that data.

In some embodiments, the entity properties 212 identified in the set of entity identifiers 210 include at least two of the following: a user identification property 302, a domain identification property 306, an access control identification property 308, a security property 304, a non-digital-location identification property 310, a digital-location identification property 312, a physical machine identification property 314, or a virtual machine identification property 316.

In some embodiments, the entity extraction rules 236 in the entity extraction rules database 234 include at least one of the following: a rule 402 which extracts at least one entity field value from event data 408 that has a JSON format, a rule 404 which includes a regular expression definition 410, or a rule which identifies a particular character 414 as being a data splitting character 416.

Some embodiments include an entity extraction example collector 224 which upon execution collects at least one entity extraction example 226. In some embodiments, at least one collected entity extraction example in the system includes a query directed at event data.

Some embodiments include an entity extraction rules modeler 246 which upon execution computes an entity extraction rule 236 based on at least one collected entity extraction example 226, and which alters the entity extraction rules database 234 to include the computed entity extraction rule in the database.

In some embodiments, the entity extraction rules modeler includes a frequency calculation code 510 which calculates a relative or absolute frequency 512 of candidate entity extraction rules, to allow the entity extraction rules modeler 246 to favor rules 236 that have greater frequency than other rules.

Some embodiments generate a model which is frequency based using an edit distance metric. For example, a regular expression that is in common use may be considered as a common entity extraction rule and be proposed to other users.

When rules have the same frequency, or as an alternative to using frequency, an edit distance metric may be used. An edit distance metric pertains to words which are similar but not equal. For example, a distance can be measured between "username", "username1", and "myusername", e.g., by the number of single-character operations (deletion, addition, or substitution) which is sufficient to transform one word to another word. The edit distance metric defines the distance (i.e., similarity) between the words. Similar words ("user", "user1") are closer to each other than less-similar words ("user", "host").

In some embodiments, the entity extraction rules modeler includes a machine learning classifier 508 that is trained to classify candidate rules according to their resemblance to other rules that have been applied to a similar data source, or applied to populate the same or similar entities 230, to allow the entity extraction rules modeler 246 to favor candidate rules 236 that have been classified as sufficiently close to positively scored training set rules. In some embodiments, the classifier 508 is trained on a set of {data sources, extraction object} tuples, and then when a new data source is observed the classifier predicts the extraction object. One suitable classifier 508 technology is neural networks technology.

Other system embodiments are also described herein, either directly or derivable as system versions of described methods or configured media, informed by the extension discussion herein of computing hardware.

Methods

Technical methods shown in the Figures or otherwise disclosed will be performed automatically, e.g., by an enhanced event data management tool 202 having one or more of the enhancement components 232, unless otherwise indicated. Methods may also be performed in part automatically and in part manually to the extent action by a human administrator or other human person is implicated, e.g., by operating the user interface 204 to indicate acceptance of a recommendation 244 for use of a particular rule 236 for parsing a particular source's event data 218. No method contemplated as innovative herein is entirely manual. In a given embodiment zero or more illustrated steps of a method may be repeated, perhaps with different parameters or data to operate on. Steps in an embodiment may also be done in a different order than the top-to-bottom order that is laid out in FIGS. 12 to 14. Steps may be performed serially, in a partially overlapping manner, or fully in parallel. In particular, the order in which the flowchart 1400 is traversed to indicate the steps performed during a method may vary from one performance of the method to another performance of the method. The flowchart traversal order may also vary from one method embodiment to another method embodiment. Steps may also be omitted, combined, renamed, regrouped, be performed on one or more machines, or otherwise depart from the illustrated flow, provided that the method performed is operable and conforms to at least one claim.

With reference to FIGS. 12 to 14, some embodiments provide or use an entity extraction method for efficient parsing to populate entity properties based on event data. Methods may be considered from an administrator perspective which includes data processing activities of an event data management tool and activities that enhance entity extraction to support that data processing.

In one example, an event data processing and entity extraction method includes an event data management tool 202 managing 1202 baseline event data from a baseline set of event data sources. An entity extraction enhancer 232 (which may be integrated in the tool 202 or external to it) collects 1204 multiple entity extraction examples from one or more outputs of the event data management tool based on the baseline event data, and computes 1206 with a digital processor at least one entity extraction rule 236 based on at least one collected entity extraction example. Each computed entity extraction rule specifies 1208 a parsing mechanism 238 to parse at least one entity field. The event data management tool receives 1210 additional event data from an additional event data source which is not in the baseline set of event data sources. The entity extraction enhancer 232 applies 1212 the parsing mechanism specified by one of the entity extraction rules to extract 1214 one or more entity field values from the additional event data and to populate 1216 one or more corresponding entity properties using the one or more extracted entity field values.

In some embodiments, collecting 1204 multiple entity extraction examples includes collecting 1402 queries 502 written by users and collecting 1404 results 504 of the queries.

In some embodiments, computing 1206 an entity extraction rule includes determining 1406 a mapping from a column name 506 to an entity property 212.

Some embodiments assign 1408 a correctness certainty level 514 to an entity extraction rule. As one example of many possible examples showing how the correctness certainty level could be calculated and used, assume there is historical data for 1000 users who manually extracted IP address value into an entity. Assume 900 of these users took the value 222 that was stored in a column named "IP_Address", and the other 100 users did different things, e.g., 50 users took the value from a column named "DestAddress", 10 users employed a regular expression on data in a column called "Meta data", and so on. The output in each extraction matched a template of the form #.#.#.#, as expected for an IPv4 address in dot decimal format).

In this situation, assume as a first case that a new user connects to a new data source, wherein the data source has a column called "IP_Address" and contains data matching the #.#.#.# pattern. This context matches the similar behavioral context of the 900 out of 1000 users in the historical data. The correctness certainty level could this be calculated as 900 out of 1000, or 90%, or on a normalized scale between zero and one as 0.9.

By contrast, suppose that in a second case a new user connects to a new data source, wherein the data source has a column called "Meta data" containing free text which in some cases includes a substring matching the #.#.#.# pattern. This context matches the similar behavioral context of 10 of the 1000 users in the historical data. The correctness certainty level could this be calculated as 10 out of 1000, or 1%, or on a normalized scale between zero and one as 0.01. Regardless of the particular scale used, the certainty in the first case is much higher than in the second case.

Some embodiments get 1410 from a user a selection 1412 (e.g., icon selection, keyboard entry, mouse click, voice command etc.) indicating whether an entity extraction rule is to be applied automatically 1414 without further user consent for parsing an entity from event data. This may follow a recommendation 1418 of the rule to the user.

In some embodiments and some situations, the event data contains sufficient values 222 to populate every property 212 of a given entity. In other cases, no value corresponding to a given property (or given set of properties) is present in the event data. Regardless of whether sufficient values are present in the event data, one or more properties may go unpopulated. For instance, a user is represented in different ways by different systems. For example, many systems employ the user alias as an identifier 302. Microsoft Active Directory® products use a GUID to identify a user and call that property ObjectID. Some applications know the user's geo-location and can add it to the entity that represents the user, while other applications don't have that information. Accordingly, in some embodiments the extraction method populates 1416 between 1 and N−1 of the properties of an entity which has N properties, where N is greater than 1.

Configured Storage Media

Some embodiments include a configured computer-readable storage medium 112. Storage medium 112 may include disks (magnetic, optical, or otherwise), RAM, EEPROMS or other ROMs, and/or other configurable memory, including in particular computer-readable storage media (which are not mere propagated signals). The storage medium which is configured may be in particular a removable storage medium 114 such as a CD, DVD, or flash memory. A general-purpose memory, which may be removable or not, and may be volatile or not, can be configured into an embodiment using items such as an entity extraction rules database 234, entity extraction rules modeler 246, entity extraction example collector 224, entity extraction rule recommender 242, or entity extraction rule recommendation 244, or combination thereof, in the form of data 118 and instructions 116, read from a removable storage medium 114 and/or another source such as a network connection, to form a configured storage medium. The configured storage medium 112 is capable of causing a computer system to perform technical process steps for entity extraction rules harvesting and performance, as disclosed herein. The Figures thus help illustrate configured storage media embodiments and process embodiments, as well as system and process embodiments. In particular, any of the process steps illustrated in FIGS. 12 to 14, or otherwise taught herein, may be used to help configure a storage medium to form a configured storage medium embodiment.

Some embodiments provide or use an entity extraction method for efficient parsing to populate entity properties based on event data. Some methods may be viewed from an extraction enhancement perspective.

In some embodiments, a storage medium 114 is configured with code which upon execution by one or more processors 110 performs an entity extraction method for efficient parsing to populate entity properties based on event data. In one example, the method includes collecting 1204 multiple entity extraction examples from one or more outputs of an event data management tool based on baseline event data, computing 1206 an entity extraction rule based on at least one collected entity extraction example (with the computed entity extraction rule specifying 1208 a parsing mechanism to parse at least one entity field, altering 1302 an entity extraction rules database to include the computed entity extraction rule in the database, and applying 1212 the parsing mechanism specified by the entity extraction rule to extract 1214 one or more entity field values from additional event data and to populate 1216 one or more corresponding entity properties using the one or more extracted entity field values.

In some embodiments, the method further includes displaying 1420 to a user an association indicating that a set of entity properties are associated with a particular computing technology product 124 which is not the event data management tool or any tool performing the method. For instance, entities and properties associated with a word processor, spreadsheet, intrusion detection program, intrusion prevention program, anti-malware program, order processing application, database management program, operating system, web browser, or other software product could be displayed 1420.

In some embodiments, the method further includes displaying 1422 to a user multiple property names which each correspond to the same entity field. For instance, an IP address field 220 might correspond to IP_Address, IP, SrcAddress, and DestAddress properties. FIGS. 6 to 9 also show examples in which a data field corresponds to different column names and through them to various entity properties.

In some embodiments, the method collects 1204 one or more entity extraction examples, computes 1206 an entity extraction rule based on those collected entity extraction examples, alters 1302 the entity extraction rules database to include the computed entity extraction rule, and applies 1212 the parsing mechanism specified by the entity extraction rule to extract one or more entity field values from additional event data and to populate one or more corresponding entity properties using the one or more extracted entity field values; this set of actions collectively constitutes performing 1424 efficient parsing. In some cases with some embodiments, a total real-world time occupied by said collecting, computing, altering, and applying (i.e., performing 1424) is less than X, where X is thirty seconds. In some cases, X is fifteen seconds. In some, X is one minute.

In most of not all cases, however, the maximum entity extraction performance time X is less than the average time it would take a human user to search through available data, select an extraction rule from a set of visually displayed rules or formulate a new rule based on rules previously used by other users or previously used against other data sources, and apply the selected rule. The human user would not, for instance, have access to a database of rules that includes rules applied in other contexts, rule derived from queries, rules with assigned correctness certainty levels, and other structures and procedures described herein. As a result, taking advantage pf the teachings herein substantially improves the harvesting and performance of entity extraction rules to support visualizations, analyses, and other event data processing operations.

Some Additional Examples with Queries

Some embodiments use or provide a system or method to automatically extract entities from security events and alerts based on a form of crowdsourcing. Some learn the entities 230 to be extracted from the event data 218 by watching what other users 104 did, and consolidate or construct a model 234 and generate recommendations 244 based on that model.

In some cases, the set of possible entities 230 is known and defined by a particular product 124. For example, some products have a UserAccount entity 230 with properties UserName, Domain, SID, Location, and others. Some have an Endpoint entity 230 with properties IPaddress and Port. Some have a Machine entity 230 with properties MachineName, ComputerName. One of skill will recognize that these are just of few of the many possibilities. In this example, and with reference to FIG. 3, UserName is a user identification property 302, Domain is a domain identification property 306, SID is an access control identification property 308 and also a security property 304, Location is a non-digital location identification property 310, IPaddress and Port are each a digital location identification property 312, and so on.

In some cases, automatically extracting entities 230 and their properties 212 from data of a given data source 216 is based on an understanding of a schema of the data and the way information is saved in the data at the data source. By way of illustration, FIGS. 6, 7, and 8 show some data schemas. All three Figures show the same field values, but the values are embedded in data 218 in different ways, by different data sources.

In order to extract into the UserAccount entity from data of a first data source (FIG. 6), the following query can be used:

```
SELECT User AS UserAccount.UserName,
    Domain AS UserAccount.Domain,
    ExtractJson(MoreData.UserSID) AS UserAccount.SID
FROM DataSource1
```

In order to extract into the UserAccount entity from data of a second data source (FIG. 7), the following query can be used:

```
SELECT splitSlash(ExtractJson(UserDetails.user), 'after') AS
UserAccount.UserName,
    splitSlash(ExtractJson(UserDetails.user), 'before') AS UserAccount.
Domain,
    ExtractJson(UserDetails.userSID) AS UserAccount.SID
FROM DataSource2
```

In order to extract into the UserAccount entity from data of a third data source (FIG. 8), the following query can be used:

```
SELECT regex(Trace, "*\[ ] '(S-*") AS UserAccount.UserName,
    regex(Trace, "User '[ ]\ '(S-*") AS UserAccount.Domain,
    regex(Trace, "*('[ ]')*") AS UserAccount.SID
FROM DataSource3
```

One of skill will understand that the MoreData and User Details fields contain data in a JSON format, that the line wrapping present in the query of DataSource2 as formatted in this disclosure has no semantic or functional effect, that DataSource2 uses a slash character as a data splitting character, that DataSource3 data is in a form often used by traces, that "regex" stands for "regular expression", that entities are not limited to those used with Microsoft® products, and that the IP address values shown in this disclosure have been sanitized whereas in a production environment the data 218 may well include public routable IP addresses.

The extracted property values for all three queries above is the same. This example also illustrates populating less than all of the properties of the UserAccount entity. Once the correct values are in the correct properties, populated entities and their connections can be used to generate new security alerts and to investigate them, for example. However, because an understanding of data formats and item names is involved, the underlying actions for locating desired data and extracting it into entities can be frustrating and very prone to mistakes when done manually. Teachings presented herein can assist users by reducing or removing reliance of specific technical details, and can help a system monitor data for changes.

FIG. 9 shows an example portion of a recommendation 244, in the form of a result of applying a recommended extraction rule. The results could be displayed 1418 with text such as "We noticed a new data source was added lately. Do the examples below accurately reflect the UserAccount?" and response buttons. One response button could be labeled "Let me review" or the like. Pressing this button will show the user additional info, such as a query created to extract values 222. The query may be editable by the user. Another response button could be labeled "Yes, map entity" or the like. Pressing this button will map the entity using the recommended rule, and start generating populated entities for existing data or newly added data.

Some Additional Examples with Phases

As an additional architectural example, some embodiments operate in three phases:
1. Collecting Learning Data
2. Creating Entity Extraction Model
3. Generating New Extraction Proposals Phase I—Collecting Learning Data. In order to make recommendations 244 to users regarding entity extraction, a system is taught what are the entities 230, what form the entities take, and how users have previously extracted values into them. Based on that knowledge, one can generate a model. Data of users who already mapped their data sources to entities is collected 1204. The data collection includes collecting 1402 such as queries the users wrote and their results 504. Other implicit extraction rule examples, and explicit extraction rule examples, may also be collected 1204. For instance, extraction rules may be inferred from examples that include Splunk® props.conf file content or other configuration file content (mark of Splunk, Inc.).

Phase II—Creating Entity Extraction Model. Based on the data collected in Phase I, a model is created. The model reflects syntactic patterns of values. For example, in many of not all instances a SID property 212 of a UserAccount entity 230 has a structure matching (S-#-#-#). A system can learn the pattern of query results by users who configured extraction into this entity. Another learning activity uses column names 506. If most of the users historically mapped a column called 'user' or 'username' to the UserName property of the UserAccount entity, then the enhanced system can offer a different user the same behavior.

Phase III—Generating New Extraction Proposals. Once an extraction logic 236 exists, it is used for different customers or different data sources, or both, than were present in the context of the examples on which the extraction logic 236 was based.

In some embodiments, Phase II and Phase III are combined and collectively referred to as a single phase. In others, Phase I and Phase II are combined and collectively referred to as a single phase.

Some Additional Examples with Data Flow Diagrams

Figure 10:
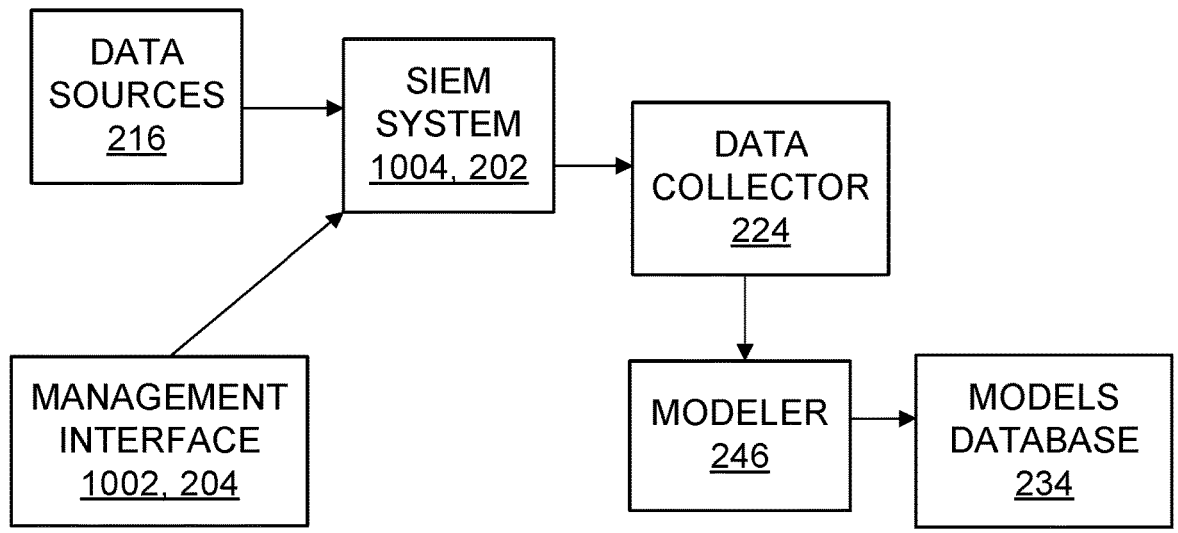
FIG. 10 is a data flow diagram illustrating aspects of a learning phase of an entity extraction system environment.

FIG. 10 illustrates an architecture in some embodiments during a Learning Phase. Data 218 flows from one or more data sources 216 to a SIEM system 1004 which is controlled by commands flowing from a management interface 1002. Data extraction examples 226 are collected from the SIEM system 1004 by a collector 224, which feeds a modeler 246, which builds a database 234 of models (extraction rules). In this example, the management interface 1002 is where a user configures the system to identify the data sources 216 being used. The examples 226 include extractions performed for a user, e.g., queries 502, and the extraction results 504, 222.

Figure 11:
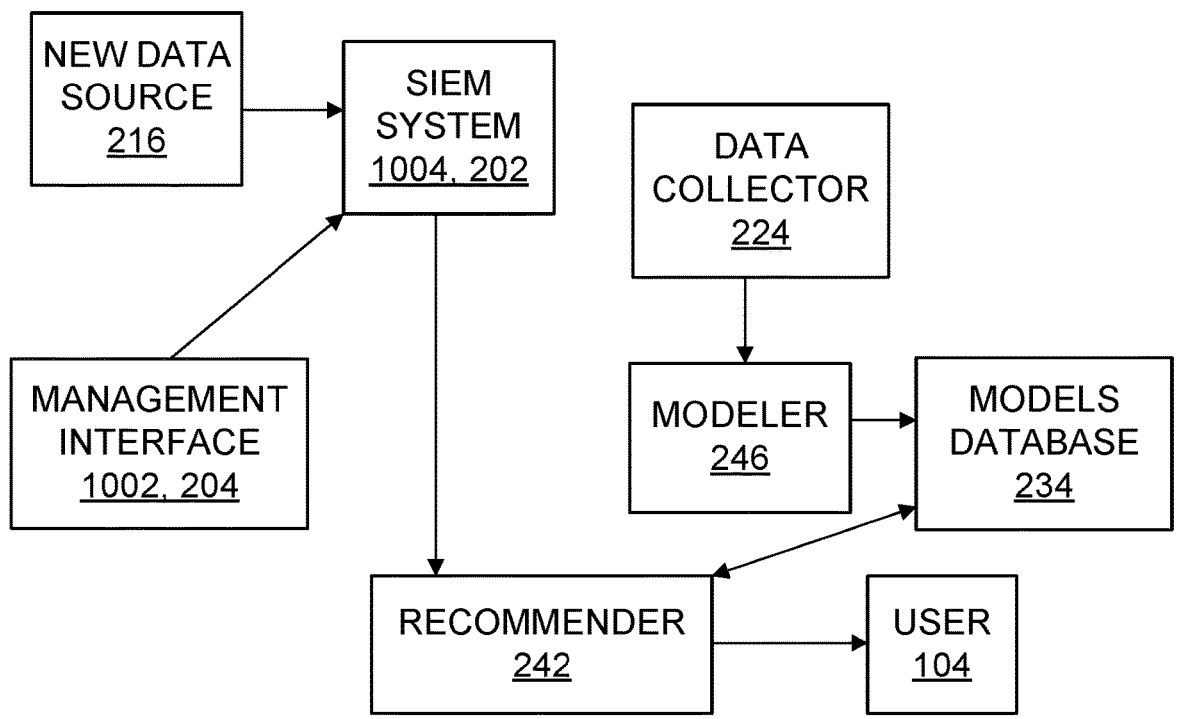
FIG. 11 is a data flow diagram illustrating aspects of a recommendation phase of an entity extraction system environment.

FIG. 11 illustrates the same architecture as FIG. 10, or an overlapping architecture, during a Recommendation Phase. Data 218 flows from an additional data source 216 to the SIEM system 1004, which is still controlled by commands flowing from the management interface 1002. The new data source's data, as gathered by the SIEM system, is fed to a recommender 242, along with candidate extraction rules from the database 234. The recommender listens to the new data source, looks for matches in the model database, and then provides an extraction rule recommendation 244 to a user 104. The recommendation 244 may notify 1428 the user of newly detected entities. The user may be the same user as in FIG. 10, or a different user.

One of skill will acknowledge that although processing large amounts of event data is a common task in SIEM systems, it could be relevant in any security system that collects events and needs the data to be normalized. In addition to SIEM systems 1004, event data management tools 202 that may benefit from teachings provided herein include user and entity behavior analytics (UEBA) systems, and machine learning (ML) based detection engines, for instance.

Some Additional Examples with Usage Scenarios

One usage scenario includes a customer 104 adding a new data source 216. Data 218 of the data source is scanned and a recommendation 244 to extract its entities is presented in the user interface. The recommendation can include examples to make effects and options clearer to the user, e.g. "By applying the suggested extraction the Entity 'SID' will look like . . . " and the enhanced system may present a list of examples from the customer's own data.

Another usage scenario includes periodically or at least intermittently scanning a set of existing data sources for changes. In many cases the data sources provide traces 218 or logs 218 of operational actions. The traces (which are often formatted as free text) may be changed and in particular new entities can be added. Precautionary scanning can catch 1426 these changes and allow an enhanced system to produce a recommendation on entities that were recently added to existing data sources. In familiar environments, it can be very hard to manually track existing data sources, therefore users were often unaware of such entity changes, and missed an opportunity to extract relevant values, due to a lack of resources. Some embodiments notify 1428 users upon detecting newly added entities.

Some usage scenarios include an internal use of a computed entity extraction rule. That is, the enhanced system does not explicitly suggest use of a certain extraction to the customer, but instead automatically 1414 applies 1212 the extraction rule. The automation can be done based on a certainty level 514. Another option is to let the customer choose whether to enable automated extraction application or not. These options can also be combined, e.g., the user can choose an option to "automate extraction only when the certainty level is at least Y, otherwise notify me before applying an extraction rule I did not explicitly enter into the system".

In another usage scenario, an organization has a dedicated system for entrance management. Every time an employee uses an employee badge to enter or exit the building, that action is recorded, together with details such as the badge ID, timestamp, and the door used. The security department wants to connect that badge tracking system to the SIEM solution 1004 they are using, to correlate badge activity with security events which are triggered from any IP address located inside the organization's office building. The badge tracking data 218 is stored on an Entrance Management System server as hourly-updated *.csv files. The SIEM system will have connection code running periodically which fetches those csv files to the SIEM system. If a user added entity extraction rule examples (e.g., queries 502), they will also be collected, and the query results 504 such as an extracted populated TrackedUser entity will be collected.

In another usage scenario, the organization is a chocolate factory which has IoT (Internet of Things) solutions including hundreds of sensors monitoring their manufacturing machines' behavior to make sure they are all working as expected (as to temperature, batch weight, etc.). The sensor data 218 is collected through an IoT sensor hub into an event hub. The SIEM system has a connection to read the data 218 from the event hub in real-time. If a user added entity extraction rule examples (e.g., queries 502), they will also be collected, and the query results 504 such as an extracted populated MixingVat entity will be collected.

Some Additional Combinations and Variations

Any of these combinations of code, data structures, logic, components, communications, and/or their functional equivalents may also be combined with any of the systems and their variations described above. A process may include any steps described herein in any subset or combination or sequence which is operable. Each variant may occur alone, or in combination with any one or more of the other variants. Each variant may occur with any of the processes and each process may be combined with any one or more of the other processes. Each process or combination of processes, including variants, may be combined with any of the configured storage medium combinations and variants describe above.

CONCLUSION

In short, with the benefit of teachings provided herein, Security Information and Event Management tools 1004, 202, log management tools 202, log analysis tools 202, and other event data management tools 202 are enhanced. Enhancements 232 harvest entity extraction rules 236 from queries 502, from query results 504, and from other examples 226 involved in the extraction of field values 222 from large amounts of data 218. Enhancements 232 also help systems perform 1424 entity extraction efficiently. Entity extraction operations locate IP addresses, usernames, and other field values 222 that are embedded in logs or data streams, for example, and populate 1216 object properties 212 with extracted values 222. Previously used extraction rules 236 are applied in new contexts with different users 104, different data sources 216, or both. An entity extraction rules database 234 serves as a model that contains rules 236 specifying parsing mechanisms 238. Parsing mechanisms 238 may include regular expressions 412, or separation character 416 definitions, for example. Parsing mechanisms 238 may process particular file formats such as CSV, or object notation formats such as JSON, or markup language formats such as XML, for example. A recommender 242 suggests 1418 one or more extraction rules 236 to users, based on frequency 512, machine learning classifications 508, correctness certainty 514, or other considerations.

Although particular embodiments are expressly illustrated and described herein as processes, as configured storage media, or as systems, it will be appreciated that discussion of one type of embodiment also generally extends to other embodiment types. For instance, the descriptions of processes in connection with FIGS. 12, 13, and 14 also help describe configured storage media, and help describe the technical effects and operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Those of skill will understand that implementation details may pertain to specific code, such as specific APIs, specific fields, and specific sample programs, and thus need not appear in every embodiment. Those of skill will also understand that program identifiers and some other terminology used in discussing details are implementation-specific and thus need not pertain to every embodiment. Nonetheless, although they are not necessarily required to be present here, such details may help some readers by providing context and/or may illustrate a few of the many possible implementations of the technology discussed herein.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable storage medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used. Similarly, a given reference numeral may be used to refer to a verb, a noun, and/or to corresponding instances of each, e.g., a processor 110 may process 110 instructions by executing them.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims and the abstract, as filed, are part of the specification.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. An entity extraction system for efficient parsing to populate entity properties based on event data, the system comprising:
   a processor;
   a digital memory in operable communication with the processor;
   a set of entity identifiers, each entity identifier comprising at least one entity property identifier;
   an entity extraction rules database containing a plurality of entity extraction rules, each entity extraction rule specifying a parsing mechanism to parse at least one entity field of event data;
   an entity extraction rule recommender which upon execution by the processor examines particular event data from an event data source and produces a recommendation citing at least one entity extraction rule and also targeting at least one entity identifier for use in extracting one or more entity field values from the particular event data and using the one or more extracted entity field values to populate one or more corresponding entity properties; and
   an entity extraction rules modeler which includes a machine learning classifier that upon execution classifies the entity extraction rule according to its resemblance to one or more other entity extraction rules.

2. The system of claim 1, further comprising an entity parser which upon execution receives the recommendation and applies the parsing mechanism specified by the entity extraction rule cited in the recommendation to extract one or more entity field values from the particular event data and to populate one or more corresponding entity properties using the one or more extracted entity field values.

3. The system of claim 1, further comprising a user interface, wherein the entity parsing recommender upon execution recommends to a user through the user interface at least one entity extraction rule from the entity extraction rules database and at least one entity identifier, as being items which correspond to the particular event data.

4. The system of claim 1, wherein the entity properties identified in the set of entity identifiers include at least two of the following: a user identification property, a domain identification property, an access control identification property, a security property, a non-digital-location identification property, a digital-location identification property, a physical machine identification property, a virtual machine identification property.

5. The system of claim 1, wherein the entity extraction rules in the entity extraction rules database include at least two of the following:
a rule which extracts at least one entity field value from event data that has a JSON format;
a rule which includes a regular expression definition;
a rule which identifies a particular character as being a data splitting character.

6. The system of claim 1, further comprising:
an entity extraction example collector which upon execution collects at least one entity extraction example; and
an entity extraction rules modeler which upon execution computes an entity extraction rule based on at least one collected entity extraction example, and which alters the entity extraction rules database to include the computed entity extraction rule in the database.

7. The system of claim 6, wherein at least one collected entity extraction example in the system includes a query directed at event data.

8. The system of claim 1, wherein the system includes an entity extraction rule usage frequency calculation code.

9. The system of claim 1, further comprising code which upon execution assigns a correctness certainty level to an entity extraction rule based at least in part on historical extraction data.

10. An entity extraction method for efficient parsing to populate entity properties based on event data, the method comprising:
an event data management tool managing baseline event data from a baseline set of event data sources;
an entity extraction enhancer collecting multiple entity extraction examples from one or more outputs of the event data management tool based on the baseline event data;
the entity extraction enhancer computing with a digital processor at least one entity extraction rule based on at least one collected entity extraction example, each computed entity extraction rule specifying a parsing mechanism to parse at least one entity field;
assigning a correctness certainty level to the computed entity extraction rule based at least in part on historical extraction data;
the event data management tool receiving additional event data from an additional event data source which is not in the baseline set of event data sources, the baseline set of data sources underlying the entity extraction rule, in that the entity extraction enhancer collected multiple entity extraction examples from one or more outputs of the event data management tool based on the baseline event data from the baseline set of data sources, and the entity extraction enhancer computed the entity extraction rule based on at least one collected entity extraction example; and
the entity extraction enhancer applying the parsing mechanism specified by one of the entity extraction rules to extract one or more entity field values from the additional event data and to populate one or more corresponding entity properties using the one or more extracted entity field values.

11. The method of claim 10, wherein collecting multiple entity extraction examples comprises collecting queries written by users and collecting results of the queries.

12. The method of claim 10, wherein computing an entity extraction rule comprises determining a mapping from a column name to an entity property.

13. The method of claim 10, wherein computing an entity extraction rule comprises identifying a particular character as being a data splitting character.

14. The method of claim 10, further comprising getting from a user a selection indicating whether an entity extraction rule is to be applied automatically without further user consent for parsing an entity from event data.

15. The method of claim 10, wherein the method populates between 1 and N-1 of the properties of an entity which has N properties, N greater than 1.

16. The method of claim 10, further comprising recommending an entity extraction rule to a user.

17. A storage medium configured with code which upon execution by one or more processors performs an entity extraction method for efficient parsing to populate entity properties based on event data, the method comprising:
collecting multiple entity extraction examples from one or more outputs of an event data management tool based on baseline event data;
computing an entity extraction rule based on at least one collected entity extraction example, the computed entity extraction rule specifying a parsing mechanism to parse at least one entity field;
calculating a frequency of use of the entity extraction rule;
altering an entity extraction rules database to include the computed entity extraction rule in the database in association with the calculated frequency of use; and
applying the parsing mechanism specified by the entity extraction rule to extract one or more entity field values from additional event data and to populate one or more corresponding entity properties using the one or more extracted entity field values.

18. The storage medium of claim 17, wherein the method further comprises displaying to a user an association indicating that a set of entity properties are associated with a particular computing technology product which is not the event data management tool or any tool performing the method.

19. The storage medium of claim 17, wherein the method further comprises displaying to a user multiple property names which each correspond to the same entity field.

20. The storage medium of claim 17, wherein the method collects one or more entity extraction examples, computes an entity extraction rule based on those collected entity extraction examples, alters the entity extraction rules database to include the computed entity extraction rule, and applies the parsing mechanism specified by the entity extraction rule to extract one or more entity field values from additional event data and to populate one or more corresponding entity properties using the one or more extracted entity field values, and the total real-world time occupied by said collecting, computing, altering, and applying is less than thirty seconds.

* * * * *